United States Patent Office 3,011,912
Patented Dec. 5, 1961

3,011,912
PROCESS FOR DEPOSITING BETA SILICON CARBIDE
Paul J. Gareis and Paul H. Mohr, Tonawanda, N.Y., assignors to Union Carbide Corporation, a corporation of New York
Filed Dec. 22, 1959, Ser. No. 861,314
12 Claims. (Cl. 117—106)

This invention relates to a process of depositing the beta form of silicon carbide upon an inorganic substrate. More particularly, this invention relates to a process whereby a thin film of beta silicon carbide is deposited upon an inorganic substrate, said film strongly adhering to said substrate, and to the composite article produced thereby.

It is an object of this invention to provide a process whereby an inorganic substrate can be coated with a thin, strongly adhering film of beta-silicon carbide.

It is a further object of this invention to provide an easily controlled process for coating an inorganic substrate with beta-silicon carbide.

Other objects and advantages of the invention will be made more apparent by the following description and examples.

The present invention provides a process whereby beta-silicon carbide films are deposited on various inorganic substrates by a thermal decomposition of tetramethyl silane, a mixture of silane and methane, or a mixture of tetramethylsilane and methane. The film of beta-silicon carbide thus deposited adheres strongly to the inorganic substrate.

The process of this invention essentially involves the thermal decomposition of a reactant feed gas comprising either tetramethylsilane, a mixture of tetramethylsilane and methane or a mixture of silane ($SiH_4$) and methane at hereinafter specified temperatures and at hereinafter specified reactant pressures in the presence of an inorganic substrate whereby a strongly adhering thin film of beta-silicon carbide is deposited upon said inorganic material.

The process of this invention is conducted generally as follows:

The inorganic substrate having a high enough melting point is placed in a suitable vacuum chamber, said vacuum chamber having an associated means for heating said inorganic substrate to and maintaining said inorganic substrate at a temperature of at least 750° C. The vacuum chamber is sealed and evacuated. The reactant feed gas is then allowed to flow into the vacuum chamber at such a rate so as to maintain the reactant pressure therein at from about 0.1 mm. Hg to not greater than 2.0 mm. of Hg. The inorganic substrate is then heated to a temperature of at least 750° C., while the reactant pressure is maintained within the above-described limits for the period of the thermal decomposition.

Figure 1:
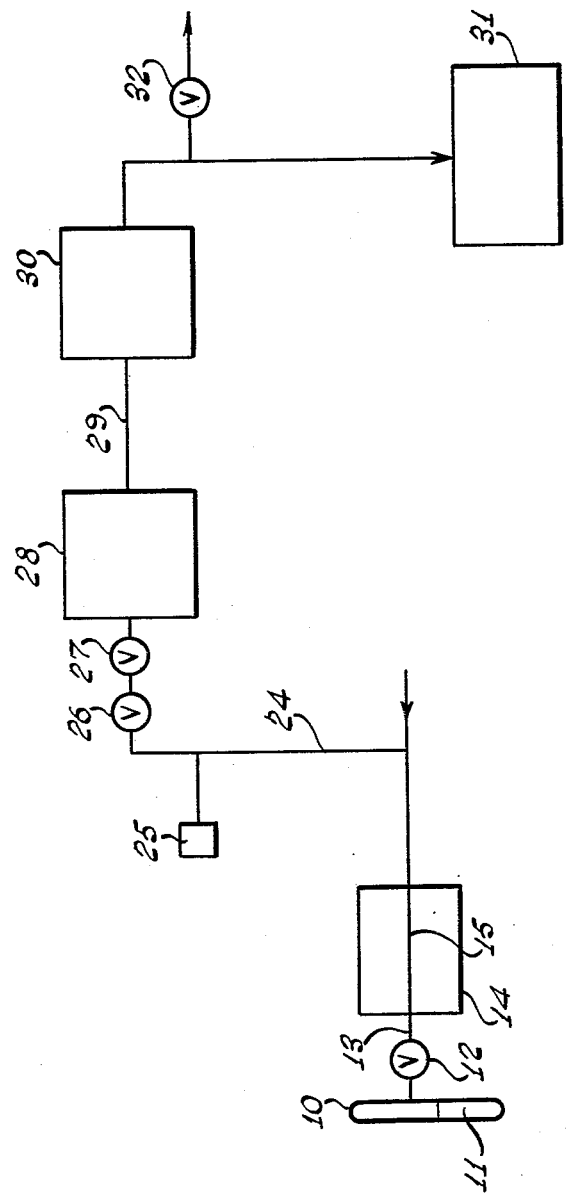
Figure 2:
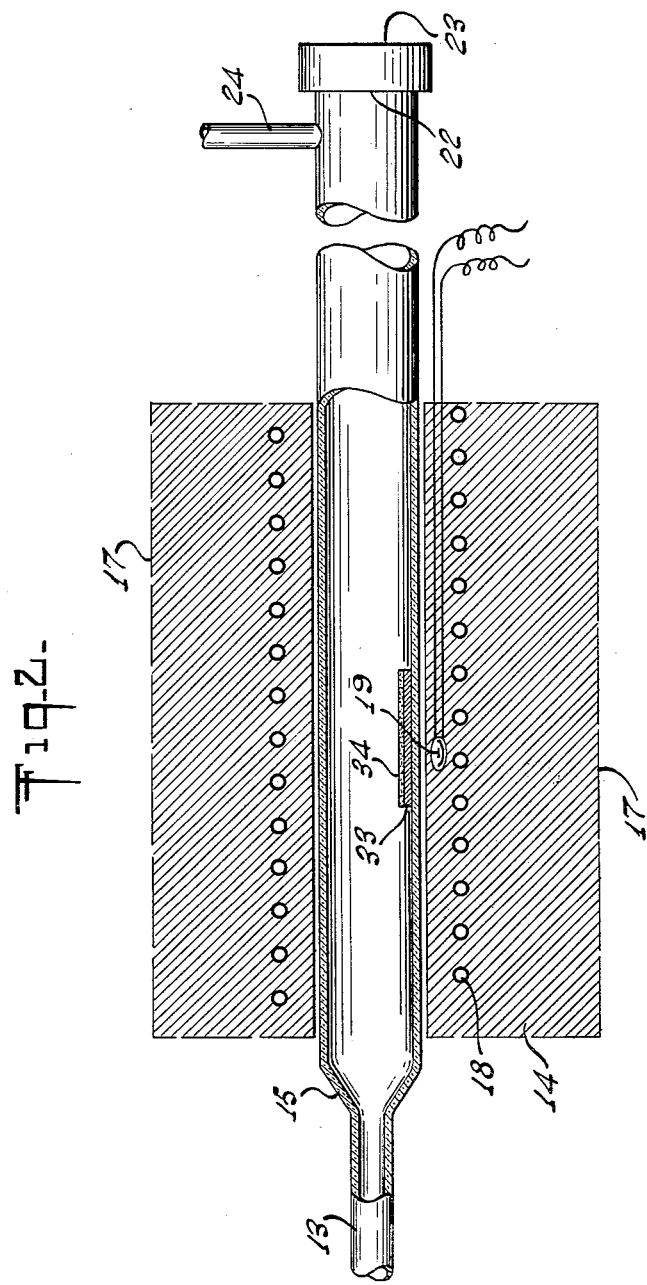

This invention may be better understood by reference to the accompanying drawings, wherein:

FIG. 1 is a diagrammatic view of apparatus suitable for carrying out the process, and FIG. 2 is a view of a fragmentary, longitudinal cross section through the reaction chamber wherein the thermal decomposition of the feed gas and deposition of the beta silicon carbide take place.

In FIG. 1 reference number 10 denotes a container for holding a supply of the reactant feed gas 11. By means of valve 12 in conduit 13 connected between container 10 and one end of a reaction chamber 15, the reactant feed gas is allowed to flow into reaction chamber 15 in section 14 wherein the thermal decomposition is to take place and wherein beta silicon carbide is deposited upon an inorganic substrate. The main portion of the reaction chamber 15 within section 14 is seen in FIG. 2. Section 14 includes a heating furnace portion having a heatable zone 17 surrounding the main part of the reaction chamber 15. The heat may be produced by suitable means such as a coiled electric resistance heating element 18. A thermocouple junction 19 is disposed adjacent the heating element 18 and is connected to a suitable means for measuring the temperature of heatable zone 17. The heatable zone 17 and coil 18 are annularly spaced about reaction chamber 15. The coil 18 is controllably, energized to heat reaction chamber 15 and the inorganic substrate 33 to the temperature at which the thermal decomposition of the feed gas takes place. Reaction chamber 15 has at one end a feed gas inlet connected to conduit 13 for the entry of the feed gas and at the opposite end is an exit to which is connected a sample entry aperture 22, said sample entry aperture 22 being capable of being sealed by cap 23 after the placing of a sample to be coated in reaction chamber 15. Reaction chamber 15 in zone 14 is connected by a conduit 24 to a suitable vacuum measuring means 25, for example, a Mac Leod gauge and also through valves 26 and 27 to a suitable low temperature means 28 for trapping condensable materials. One such low temperature means being, for example, a trap cooled with liquid nitrogen. The low temperature means for trapping condensable materials is also connected by conduit 29 to a high vacuum producing device comprising, for example, an oil or mercury diffusion pump 30 in series with a mechanical fore pump 31, such high vacuum producing device being capable of maintaining the pressure within the prescribed limits during the period of the thermal decomposition. A vent valve 32 is connected between the pumps for opening the system to the atmosphere at the completion of the reaction.

In FIG. 2 there is also shown a properly positioned inorganic substrate 33 having a thin film of beta silicon carbide 34 deposited thereon.

In some instances it may be desired to dry the feed gas. The drying of the feed gas can be accomplished by interposing a trap (not shown) cooled by means of a solid carbon dioxide-acetone mixture (not shown) between the container 10 and valve 12 and passing the feed gas through such trap prior to the passage of said feed gas through valve 12 into reaction chamber 15.

It will be apparent to those skilled in the art that other methods of heating the inorganic substrate than is shown in the figures can be employed including for example, resistance heating and induction heating depending on the nature of the inorganic substrate.

As would be obvious to those skilled in the art, the apparatus, except for the reaction chamber, can be constructed entirely of glass or quartz or metal or partly of each of these materials. The reaction chamber is preferably constructed of a material capable of operating as a vacuum chamber at the temperature and pressures required for the process of this invention, such as, for example, quartz.

The pressure at which the thermal decomposition is conducted is critical. We have found that suitable films of beta-silicon carbide are deposited only when the reactant pressure is maintained at least 0.1 mm. of mercury and does not exceed 2.0 mm. of mercury during the period of the reaction. We have found that below the above minimum pressure, there is no apparent beta-silicon carbide film deposited. We have also found that when the reactant pressure is allowed to exceed the maximum range during the thermal decomposition that a heterogeneous amorphous brown powder is formed along with beta-silicon carbide flakes and a poorly adhering film of beta-silicon carbide. The reaction system should be essentially leak free so as to exclude therefrom oxidating gases.

The reactant pressure can be maintained within the desired limits by various means. One such means of maintaining the reactant pressure within the desired limits, is to keep the feed gas in liquid form by cooling and maintaining the feed gas at a constant temperature such that its vapor pressure is constant at the desired reactant pressure. It is then possible to open valve 12 fully and maintain a small flow rate by throttling at valves 26 and 27.

Another such means of maintaining the desired reactant pressure is to maintain the reactant feed gas at a higher pressure and carefully adjust both valve 12 and valves 26 or 27 to maintain the vacuum and flow conditions between the valves.

Another means of maintaining the desired reactant pressure would be to substitute or add in series with valve 12 a very sensitive pressure regulator that maintains the desired downstream vacuum pressure regardless of higher supply pressures, the flow rate being regulated at valves 26 or 27.

The temperature at which the thermal decomposition is conducted is critical and must be at least 750° C. and should not exceed 1400° C. We have found that below 750° C. no reaction takes place. Above 1400° C. many side reactions take place and the deposit formed adheres only weakly to the substrate, i.e., it can be scraped off by a fingernail.

Suitable inorganic substrates upon which a film having a suitable melting point i.e. melting above 750° C. of beta-silicon carbide can be deposited according to the process of this invention include quartz, alumina, silver, gold, tungsten, silicon, nickel, graphite, molybdenum and the like.

The reactant feed gas employed in the process of this invention includes tetramethylsilane, a mixture of tetramethylsilane and methane, and a mixture of silane and methane.

When employing the mixture of methane and tetramethylsilane in the process of this invention the mixture can contain from 0.1 to 99.9 mole percent methane and from 99.9 to 0.1 mole percent tetramethylsilane.

When employing the mixture of silane and methane in the process of this invention the mixture can contain from about 0.1 to about 3 mole percent silane in methane. Of course, higher concentrations of silane may be used; however, higher concentrations of silane may present hazards by spontaneously igniting when exposed to air. It is for this reason that we prefer to employ mixtures of silane and methane which contain 3 mole percent or less of silane.

The process of this invention is useful in depositing thin hard films of beta-silicon carbide on various substrates. A substrate coated with the hard film of beta-silicon will have a longer wear life than the substrate itself. Thus, for example sapphire phonograph needles coated with an adherent film of silicon carbide will outwear a similar uncoated sapphire phonograph needle. The utility of the process of this invention is further demonstrated in that the beta-silicon carbide films deposited by the process of this invention can be used for high temperature semi-conductor applications.

The following examples are given to further illustrate the invention:

EXAMPLE I

A typical example of the deposit of beta-silicon carbide films by the thermal reaction of tetramethylsilane on a substrate is as follows: the system was assembled as shown in the figures. A quartz plate (dimension 7.5 x 19 x 2 mm.; weight 0.459 g.) was positioned inside a 12 mm. O.D., standard wall quartz tube, 12 in. long serving as the reaction chamber. The quartz plate was positioned in the reaction chamber so that it rested over a chromel-alumel thermocouple junction. The feed gas container was filled with 25 ml. of tetramethylsilane (16 grams, 0.18 mole) and valve 12 closed. The system was evacuated to a pressure of less than 5 microns of mercury. The tetramethylsilane container was cooled by a solid carbon dioxide-trichloroethylene bath. Valve 12 was then opened fully. Valves 26 and 27 were throttled so that a flow pressure of 100 microns of Hg was established. During the run the flow pressure fluctuated between 100 and 300 microns. The heatable zone was then heated to 1000° C. and the deposition carried out for 5½ hours. As a result, the quartz plate was uniformly coated with a hard, shiny film and gained 0.0023 gram in weight. The film on the quartz plate was identified by electron diffraction as beta-silicon carbide.

The following table (Table I) summarizes subsequent experiments together with their results which were conducted according to the general procedure of Example I, but wherein the temperature and/or pressure were varied. Example I is also listed in the table as run B for convenience.

*Table I*

| Run | Feed Gas | Temperature, °C. | Reactant Pressure, mm. Hg | Results |
|---|---|---|---|---|
| A | $(CH_3)_4Si$ | 1,050 | .45–1.2 | beta-silicon carbide film formed on the quartz plate. |
| B | $(CH_3)_4Si$ | 1,000 | .1–.3 | Do. |
| C | $(CH_3)_4Si$ | 1,000 | .01–.02 | no deposit observed. |
| D | $(CH_3)_4Si$ | 1,000 | 1.0–5.0 | (a) a heterogeneous brown powder which was characterized as amorphous by electron diffraction analysis. (b) metallic flakes and a coating which were identified as beta-silicon carbide by X-ray and electron diffraction methods. |
| E | $(CH_3)_4Si$ | 500 | 1.0 | no deposit observed. |
| F | $(CH_3)_4Si$ | 700 | 1.0 | Do. |
| G | $(CH_3)_4Si$ | 750 | 1.0 | formed beta-silicon carbide film on the quartz plate. |

EXAMPLE II

In a subsequent experiment conducted according to the general procedure of Example I a feed gas comprising 0.9 mole percent tetramethylsilane and 99.1 mole percent methane was placed in a container filled with a throttling valve between the reaction chamber and the container. The system was evacuated as in Example I. The throttling valve was adjusted so that the reactant pressure was maintained between about 0.28 and 1.2 mm. Hg. The reaction chamber and quartz plate were heated to 1050° C. for approximately 5½ hours. A beta-silicon carbide film was formed on the quartz plate.

EXAMPLE III

Deposition of beta-silicon carbide by the thermal reaction of methane and silane was accomplished as follows:

A quartz boat was positioned in a ½" O.D. quartz liner tube. This tube, in turn, was placed in the heatable zone of a quartz tube serving as the reaction chamber. The system was evacuated to a pressure of less than 5 microns of mercury. The heatable zone was heated to 1050° C. and maintained at that temperature throughout the reaction. The feed gas composition fed into the reaction chamber, through a throttling valve. The feed gas composition was 3 mole percent silane and 97 mole percent methane. The flow pressure was adjusted by means of a throttling valve to about 1 mm. of mercury at a temperature of 1050° C. The system was held at 1050° C. and about 1 mm. of mercury for about 30 minutes. The system was allowed to cool at a pressure of less than 5 microns of mercury. At the end of the experiment, the quartz boat and the quartz liner tube were coated with beta-silicon carbide.

EXAMPLE IV

In another experiment carried out according to the procedure of Example III except that the pressure was maintained at between 320 to 650 microns during the reaction, a quartz plate was uniformly coated with beta-silicon carbide.

EXAMPLE V

Another experiment was conducted according to the procedure of Example III except that the feed gas employed, was a mixture of 0.1 mole percent silane in 99.9 mole percent methane. Beta-silicon carbide was deposited on a quartz plate as a thin strongly adhering film.

EXAMPLE VI

In a subsequent experiment conducted according to the procedure of Example III and wherein the pressure was maintained at 1.0 to 1.1 mm. of Hg, samples of quartz, sapphire phonograph needle and polished carbon steel were all uniformly coated with a thin strongly adhering film of beta-silicon carbide.

What is claimed is:

1. A process for the deposition of a film consisting essentially of beta-silicon carbide upon a substrate which comprises heating said substrate at a temperature of from about 750° C. to about 1400° C. in a reactant atmosphere maintained at a pressure of from about 0.1 mm. of mercury to about 2 mm. of mercury, said reactant atmosphere comprising a member of the class consisting of tetramethylsilane, a mixture of tetramethylsilane and methane, and a mixture of silane and methane to deposit a film consisting essentially of beta-silicon carbide on said substrate.

2. A process as claimed in claim 1 in which the substrate is steel.

3. A process as claimed in claim 1 in which the substrate is quartz.

4. A process as claimed in claim 1 in which the substrate is sapphire.

5. A process for the deposition of a film consisting essentially of beta-silicon carbide upon a substrate which comprises heating said substrate at a temperature of from about 750° C. to about 1400° C. while immersed in an atmosphere of tetramethylsilane at a reactant pressure of from about 0.1 mm. to about 2 mm. of mercury to deposit a film consisting essentially of beta-silicon carbide on said substrate.

6. A process for the deposition of a film consisting essentially of beta-silicon carbide upon a substrate which comprises heating said substrate at a temperature of from about 750° C. to about 1400° C. while immersed in an atmosphere comprising a mixture of tetramethylsilane and methane at a reactant pressure of from about 0.1 mm. to about 2 mm. of mercury to deposit a film consisting essentially of beta-silicon carbide on said substrate.

7. A process for the deposition of a film consisting essentially of beta-silicon carbide upon a substrate which comprises heating said substrate at a temperature of from about 750° C. to about 1400° C. while immersed in an atmosphere comprising a mixture of silane and methane at a reactant pressure of from about 0.1 mm. to about 2 mm. of mercury to deposit a film consisting essentially of beta-silicon carbide on said substrate.

8. A process as claimed in claim 7 wherein the mixture contains from about 0.1 to 3.0 mole percent silane and from 97 to 99.1 mole percent methane.

9. An inorganic substrate having on at least one of its surfaces a strongly adhering coating consisting essentially of beta-silicon carbide produced by heating said inorganic substrate at a temperature of from about 750° C. to about 1400° C. in an atmosphere maintained at a reactant pressure of from about 0.1 to about 2.0 mm. Hg said atmosphere comprising a member of the class consisting of tetramethylsilane, a mixture of tetramethylsilane and methane, and a mixture of silane and methane.

10. A process for the deposition of a film consisting essentially of beta-silicon carbide upon a substrate which comprises heating said substrate at a temperature of from about 750° C. to about 1050° C. while immersed in an atmosphere of tetramethylsilane at a reactant pressure of from about 0.1 mm. to about 2 mm. of mercury to deposit a film consisting essentially of beta-silicon carbide on said substrate.

11. A process for the deposition of a film consisting essentially of beta-silicon carbide upon a substrate which comprises heating said substrate at a temperature of from about 750° C. to about 1050° C. while immersed in an atmosphere comprising a mixture of tetramethylsilane and methane at a reactant pressure of from about 0.1 mm. to about 2 mm. of mercury to deposit a film consisting essentially of beta-silicon carbide on said substrate.

12. A process for the deposition of a film consisting essentially of beta-silicon carbide upon a substrate which comprises heating said substrate at a temperature of from about 750° C. to about 1050° C. while immersed in an atmosphere comprising a mixture of silane and methane at a reactant pressure of from about 0.1 mm. to about 2 mm. of mercury to deposit a film consisting essentially of beta-silicon carbide on said substrate.

References Cited in the file of this patent

UNITED STATES PATENTS

| | | |
|---|---|---|
| 2,788,743 | Bowman | Jan. 22, 1957 |
| 2,784,112 | Nicholson | Mar. 5, 1957 |

OTHER REFERENCES

Vapor Plating, Powell et al., John Wiley and Son, 1955, pp. 71, 72, 73, 85, 86, 87 and 88.